US011579852B2

(12) United States Patent
Sandanagobalane et al.

(10) Patent No.: US 11,579,852 B2
(45) Date of Patent: Feb. 14, 2023

(54) DEVICE PROFILING IN GPU ACCELERATORS BY USING HOST-DEVICE COORDINATION

(71) Applicant: NVIDIA Corporation, Santa Clara, CA (US)

(72) Inventors: Hariharan Sandanagobalane, Kirkland, WA (US); Sean Lee, Santa Clara, CA (US); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/939,313

(22) Filed: Jul. 27, 2020

(65) Prior Publication Data

US 2020/0356351 A1   Nov. 12, 2020

Related U.S. Application Data

(63) Continuation of application No. 16/154,560, filed on Oct. 8, 2018, now Pat. No. 10,853,044.

(Continued)

(51) Int. Cl.
*G06F 8/41* (2018.01)
*G06F 11/36* (2006.01)
(Continued)

(52) U.S. Cl.
CPC .............. *G06F 8/4441* (2013.01); *G06F 8/41* (2013.01); *G06F 8/451* (2013.01); *G06F 8/458* (2013.01);
(Continued)

(58) Field of Classification Search
CPC ............ G06F 8/4441; G06F 16/90335; G06F 16/9027; G06F 16/9024; G06F 8/41;
(Continued)

(56) References Cited

U.S. PATENT DOCUMENTS 5,758,061 A   5/1998   Plum
5,815,720 A   9/1998   Buzbee
(Continued)

OTHER PUBLICATIONS

Mohror et al., "Trace Profiling: Scalable event tracing on high-end parallel systems" (Year: 2012).*
(Continued)

*Primary Examiner* — Phillip H Nguyen
(74) *Attorney, Agent, or Firm* — Taylor English Duma LLP

(57) ABSTRACT

System and method of compiling a program having a mixture of host code and device code to enable Profile Guided Optimization (PGO) for device code execution. An exemplary integrated compiler can compile source code programmed to be executed by a host processor (e.g., CPU) and a co-processor (e.g., a GPU) concurrently. The compilation can generate an instrumented executable code which includes: profile instrumentation counters for the device functions; and instructions for the host processor to allocate and initialize device memory for the counters and to retrieve collected profile information from the device memory to generate instrumentation output. The output is fed back to the compiler for compiling the source code a second time to generate optimized executable code for the device functions defined in the source code.

20 Claims, 7 Drawing Sheets

Related U.S. Application Data

(60) Provisional application No. 62/569,380, filed on Oct. 6, 2017.

(51) Int. Cl.
  *G06F 16/903* (2019.01)
  *G06F 16/901* (2019.01)
  *G06F 9/445* (2018.01)

(52) U.S. Cl.
  CPC ...... *G06F 11/3624* (2013.01); *G06F 11/3676* (2013.01); *G06F 16/9024* (2019.01); *G06F 16/9027* (2019.01); *G06F 16/90335* (2019.01); G06F 8/443 (2013.01); G06F 9/44547 (2013.01)

(58) Field of Classification Search
  CPC ...... G06F 8/451; G06F 8/458; G06F 11/3624; G06F 11/3676; G06F 8/443; G06F 9/44547
  See application file for complete search history.

(56) References Cited

U.S. PATENT DOCUMENTS

| | | |
|---|---|---|
| 5,909,577 A | 6/1999 | Devanbu |
| 6,308,324 B1 | 10/2001 | Roediger et al. |
| 6,622,300 B1 | 9/2003 | Krishnaswamy et al. |
| 6,631,518 B1 | 10/2003 | Bortnikov et al. |
| 6,795,963 B1 | 9/2004 | Andersen et al. |
| 7,730,469 B1 | 6/2010 | Boucher |
| 7,954,094 B2 | 5/2011 | Cascaval et al. |
| 8,387,026 B1 | 2/2013 | Hundt et al. |
| 8,782,645 B2 | 7/2014 | Breternitz et al. |
| 8,789,032 B1 | 7/2014 | Li et al. |
| 8,806,463 B1 | 8/2014 | Li et al. |
| 8,819,649 B2 | 8/2014 | Lafreniere et al. |
| 9,262,166 B2 | 2/2016 | Kang et al. |
| 9,274,771 B1 | 3/2016 | Kalogeropulos et al. |
| 9,348,567 B2 | 5/2016 | Sharma et al. |
| 9,612,809 B2 | 4/2017 | Mahaffey et al. |
| 9,760,351 B2 | 9/2017 | Johnson et al. |
| 2003/0066060 A1 | 4/2003 | Ford |
| 2004/0019886 A1 | 1/2004 | Berent et al. |
| 2005/0028146 A1 | 2/2005 | Quick |
| 2007/0079294 A1 | 4/2007 | Knight et al. |
| 2007/0294681 A1* | 12/2007 | Tuck .................. G06F 11/3404 717/149 |
| 2009/0037887 A1 | 2/2009 | Chavan |
| 2012/0167057 A1 | 6/2012 | Schmich |
| 2013/0300752 A1 | 11/2013 | Grover et al. |
| 2015/0355996 A1* | 12/2015 | Smith .................. G06F 9/461 717/128 |
| 2016/0004518 A1 | 1/2016 | Sharma et al. |
| 2016/0124728 A1 | 5/2016 | Mahaffey |
| 2016/0360336 A1* | 12/2016 | Gross .................. H04W 4/025 |
| 2017/0344349 A1 | 11/2017 | He et al. |
| 2018/0165182 A1 | 6/2018 | Yoshida |
| 2018/0189040 A1 | 7/2018 | Sasanka |
| 2019/0034316 A1* | 1/2019 | Levit-Gurevich .......... G06F 11/3409 |

OTHER PUBLICATIONS

Stephenson et al., "Flexible Software Profiling of GPU Architectures" (Year: 2015).*

Schmitt et al., "Phase-Based Profiling in GPGPU Kernels" (Year: 2012).*

Hari et al., "SASSIFI: An Architecture-level Fault Injection Tool for GPU Application Resilience Evaluation" (Year: 2017).*

Malony et al., "Parallel Performance Measurement of Heterogeneous Parallel Systems with GPUs" (Year: 2011).*

Rotariu, M. C., & Apostol, E. (Oct. 2013). High-Level GPU Multi-purpose Profiler. In 2013 Eighth International Conference on P2P, Parallel, Grid, Cloud and Internet Computing (pp. 549-553). IEEE.

Stephenson, M., Hari, S. K. S., Lee, Y., Ebrahimi, E., Johnson, D. R., Nellans, D., . . . & Keckler, S. W. (Jun. 2015). Flexible software profiling of gpu architectures. In 2015 ACM/IEEE 42nd Annual International Symposium on Computer Architecture (ISCA) (pp. 185-197). IEEE. 13 pages.

Bourgoin, M., Chailloux, E., & Doumoulakis, A. (Jan. 2017). Profiling High Level Heterogeneous Programs. In Tenth International Workshop on Programmability and Architectures for Heterogeneous Multicores (MULTIPROG 2017). 34 pages.

Profile-Guided Optimizations overview; user and reference guide for the intel c++ compiler 15.0; Aug. 18, 2015; 4 pages.

Flower, R., Luk, C. K., Muth, R., Patil, H., Shakshober, J., Cohn, R., & Lowney, P. G. (Dec. 2001). Kernel optimizations and prefetch with the Spike executable optimizer. In Proc. 4th Workshop on Feedback-Directed and Dynamic Optimization (FDDO-4).

Mazières, D., & Smith, M. D. (1994). Abstract Execution in a Multi-Tasking Environment.

Dietrich, R., Schmitt, F., Widera, R., & Bussmann, M. (Sep. 2012). Phase-based profiling in gpgpu kernels. In 2012 41st International Conference on Parallel Processing Workshops (pp. 414-423). IEEE.

* cited by examiner

DEVICE PROFILING IN GPU ACCELERATORS BY USING HOST-DEVICE COORDINATION

CROSSREFERENCE TO RELATED PATENT APPLICATION

This application is a continuation of U.S. patent application Ser. No. 16/154,560, filed Oct. 8, 2018 which claims priority to, and benefit of, U.S. Provisional Patent Application No. 62/569,380, filed on Oct. 6, 2017, and entitled "COORDINATED HOST DEVICE MECHANISM FOR DEVICE PROFILING IN GPU ACCELERATORS AND CODE COVERAGE IN GPU ACCELERATORS FOR WHOLE PROGRAM AND SEPARATE COMPILATION." Each of these applications is herein incorporated by reference in its entirety. This application is related to the commonly-assigned U.S. patent application Ser. No. 16/154,542, filed on Oct. 8, 2018, and entitled "CODE COVERAGE GENERATION IN GPU BY USING HOST-DEVICE COORDINATION."

FIELD OF THE INVENTION

Embodiments of the present disclosure are related to computer program compilers, and more specifically, to optimizing compilers of software to be performed by one or more co-processors by coordinating with one or more host processors.

BACKGROUND OF THE INVENTION

Compiler optimization techniques typically use code instrumentation techniques for software programs that are to be performed by a host processor, such as a central processing unit (CPU). However, current compiler optimization techniques are not able to optimize code intended to be performed by co-processors, such as a graphics processing unit (GPU) or other fixed-function accelerator due, in part, to the difficulty in coordinating between a host processor (e.g., CPU) and a co-processor (e.g., GPU) when instrumenting code to be performed by the co-processor. Accordingly, there is a currently a need for techniques to optimize code to be performed by a co-processor, such as a GPU or other accelerator.

BRIEF DESCRIPTION OF THE DRAWINGS

Embodiments are illustrated by way of example, and not by way of limitation, in the figures of the accompanying drawings.

DETAILED DESCRIPTION OF THE INVENTION

Figure 1:
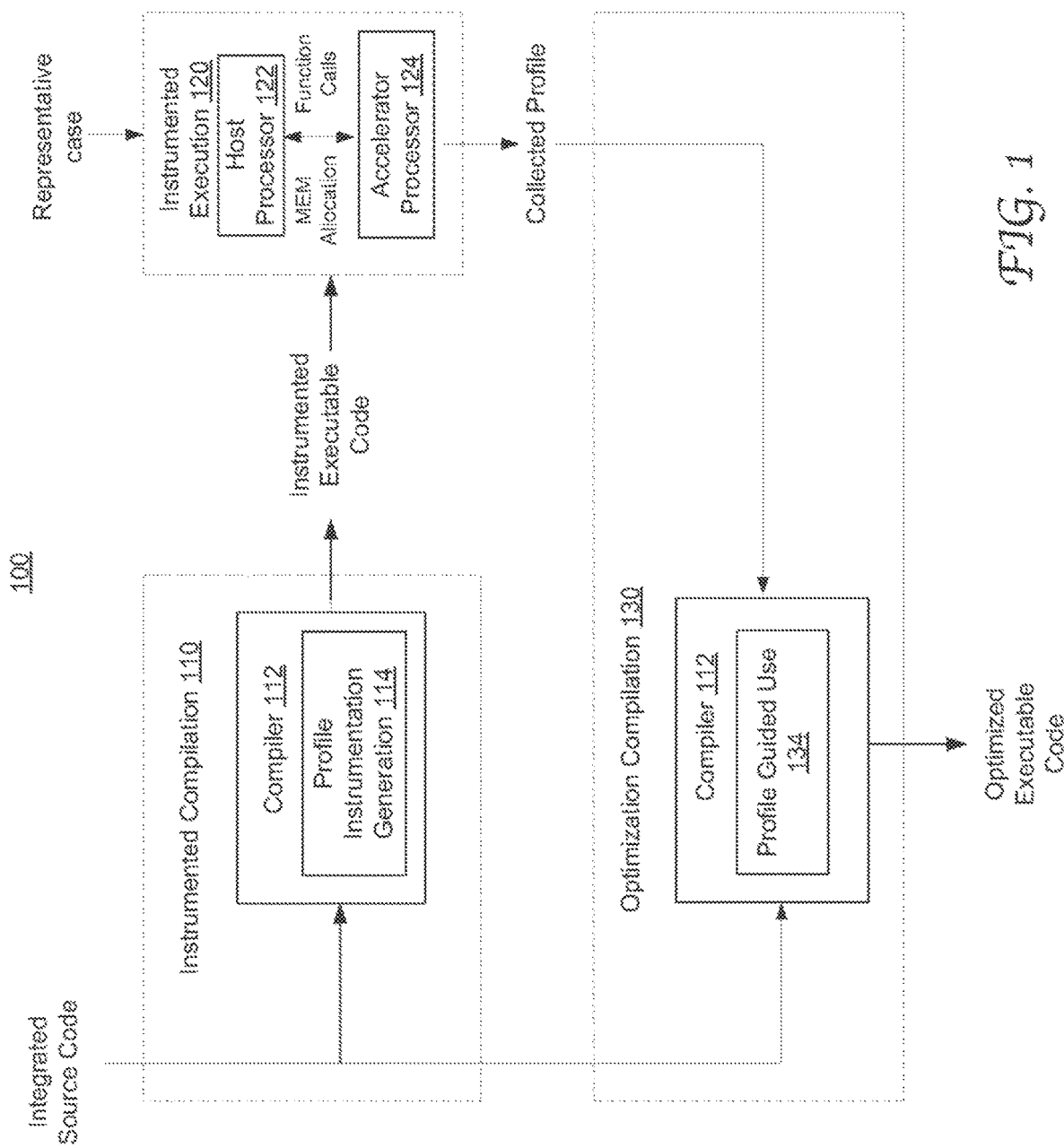
FIG. 1 illustrates a PGO flow using an exemplary integrated compiler to compile source code of a program having a mixture of host code and device code in accordance with an embodiment of the present disclosure.

Reference will now be made in detail to the embodiments of the present disclosure, examples of which are illustrated in the accompanying drawings. It will be understood that they are not intended to limit to these embodiments. On the contrary, the disclosed is intended to cover alternatives, modifications and equivalents, which may be included within the spirit and scope of the disclosure as defined by the appended claims. Furthermore, in the following detailed description of embodiments, numerous specific details are set forth in order to provide a thorough understanding. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Notation And Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" "compiling" "linking" or "accessing" or "performing" or "executing" or "providing" or the like, refer to the action and processes of an integrated circuit, or similar electronic computing device, that manipulates and transforms data represented as physical (electronic) quantities within the computer system's registers and memories into other data similarly represented as physical quantities within the computer system memories or registers or other such information storage, transmission or display devices.

Device Profiling in GPU Accelerators by using Host-Device Coordination

Embodiments of the present disclosure provide a compilation mechanism to enable generation of profile information with regard to co-processor (or device processor or accelerator processor herein) code execution, and the profile information can be used for Profile Guided Optimization (PGO). An exemplary integrated compiler can compile source code programmed to be concurrently executed by a main processor (or host processor) and a co-processor. The compilation can generate an instrumented executable code which includes: profile instrumentation counters for the device functions; and instructions for the host processor to allocate and initialize device memory for the counters and to retrieve collected profile information from the device memory to generate instrumentation output. The output is fed back to the compiler for compiling the source code a second time to generate optimized executable code.

As the performance of device code is critical to high performance computing and machine learning communities, significant performance benefits can be advantageously obtained by using compilation optimizations of the embodiments of the present disclosure based on the reliable profile information.

In one embodiment, a first processor, such as a GPU operates, as a co-processor of a second processor, such as a CPU, or vice versa. The first processor and the second professor are configured to operate in a co-processing manner.

Some embodiments of the present disclosure can be integrated in a NVCC compiler for the CUDA programming language and a General-Purpose computing on Graphics Processing Units (GPGPU) platform, e.g., with a CPU being the host and a GPU being a device. However, other embodiments of the present disclosure may also be used in any other suitable parallel computing platform that includes different types of processors.

For example, an application program written for CUDA may include sequential C language programming statements, and calls to a specialized application programming interface (API) used for configuring and managing parallel execution of program threads. A function associated with a CUDA application program that is destined for concurrent execution on a device processor is referred to as a "kernel" function. An instance of a kernel function is referred to as a thread, and a set of concurrently executing threads may be organized as a thread block.

FIG. 1 illustrates the PGO flow 100 by using an exemplary integrated compiler 112 to compile source code (e.g., CUDA) of a program having a mixture of host code and device code (e.g., mainly GPU functions) in accordance with an embodiment of the present disclosure. In one embodiment, the device code is typically mainly composed of GPU functions; the host code may be written in C++ for example and includes GPU function calls. The PGO process includes 3 phases: instrumented compilation 110, instrumented execution 120 and optimization compilation 130. The compiler 112 includes a profile instrument generation module 114 and a profile instrument use module 134.

In one embodiment, in the instrumented compilation phase 110, the compiler 112 compiles the source code to generate instrumented executable code. The profile instrument generation module 114 generates a Control Flow Graph (CFG) according to the GPU functions and inserts profile counters to the code to instrument the edges and basic blocks of the CFG. In the instrumented execution phase 120, a representative input set is provided for execution, which typically corresponds to a representative case. The host and the device execute the instrumented executable code and produce and store a profile file containing collected profile information. During the execution phase 120, a counter for a respective edge or block is updated each time the edge or block is encountered during execution. In this fashion, the counters record execution performance information regarding the various portions of the source code.

In the optimization compilation phase 130, the profile file is fed back to the compiler 112 for a second compilation on the source code, and the profile guided use module 134 performs a code optimization process based on the profile file, particularly device code optimization. As a result, an optimized executable code version is generated which can then be executed with a use case input set. As the performance of device code is critical to high performance computing, such as in the machine learning communities, significant performance benefits can be advantageously obtained by using compilation optimizations based on the reliable profile information.

As the profile information collected for a program is sensitive to changes to the compiler and the source code, it is important that the profile optimization phase 130 uses the correct profile information corresponding to the source file being compiled in the instrumented compilation phase 110 and executed in the instrumented execution phase 120. To this effect, in one embodiment, a Cyclic Redundancy Check (CRC) error detection code can be used to check based on the structure and indexes of the CFG of the program. The CRC code in combination with the function names can be used to verify the validity of profile data from collection to use phase.

Figure 2A:
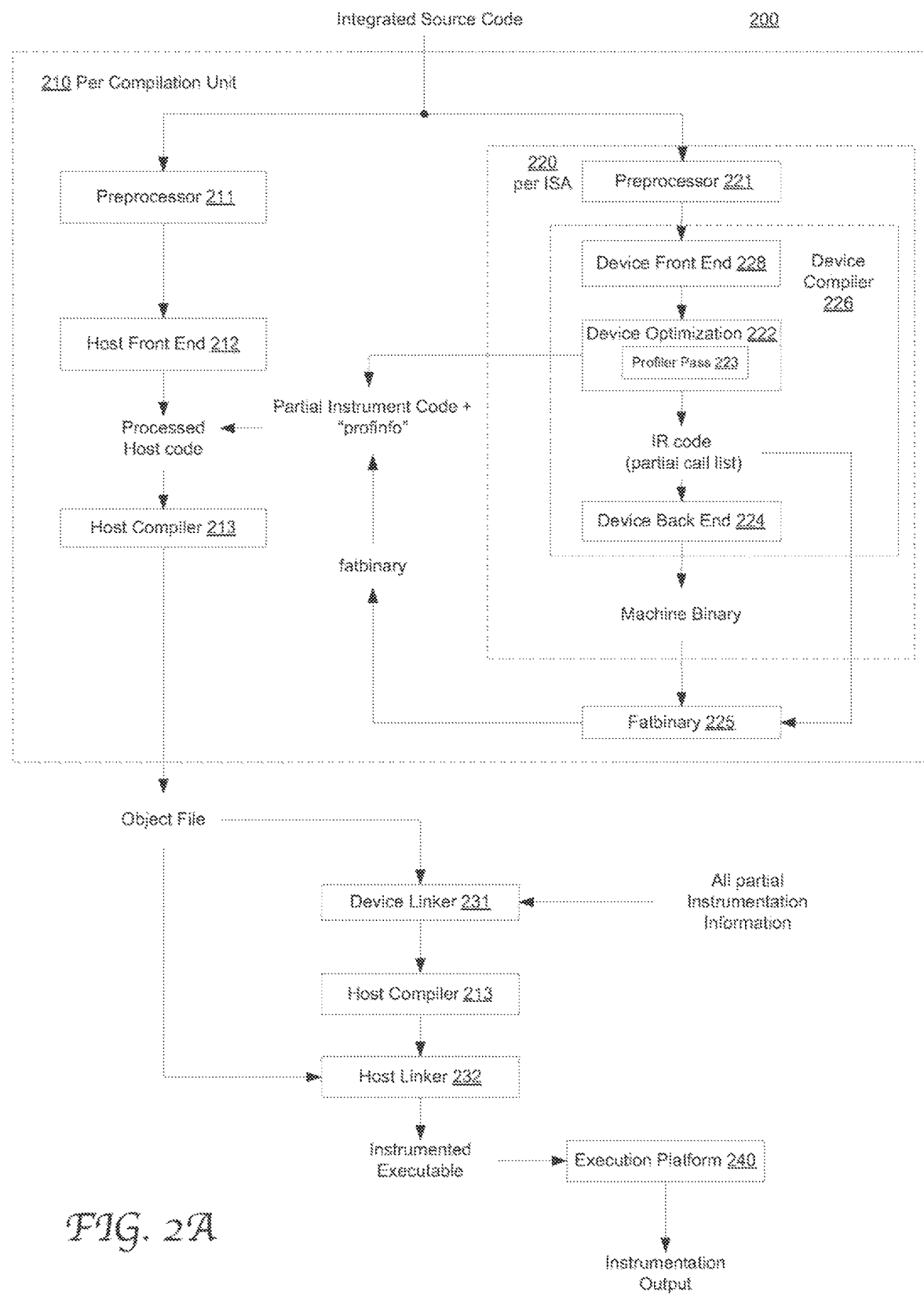
FIG. 2A illustrates an exemplary computer implemented process of instrumented compilation and execution to generate the profile information from device code execution in accordance with an embodiment of the present disclosure.

FIG. 2A illustrates an exemplary computer implemented process 200 of instrumented compilation and execution to generate the profile information of device code execution in accordance with an embodiment of the present disclosure. In one embodiment, the instrumented compilation process may be performed by an exemplary compiler that integrates the functionalities of host compilation, device compilation, and linking.

Figure 3A:
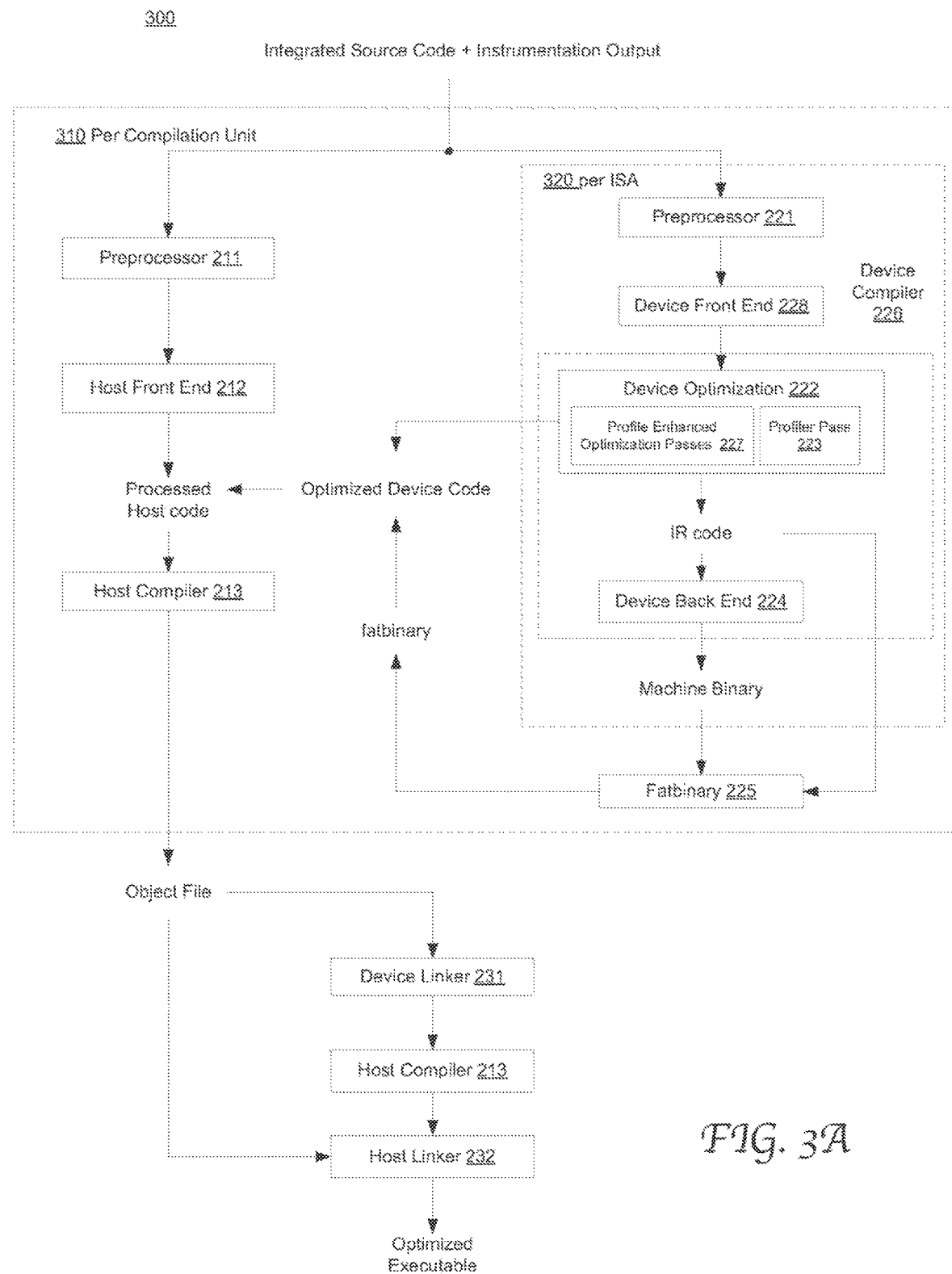
FIG. 3A illustrates an exemplary computer implemented process of optimization compilation to generate optimized executable code based on collected profile information in accordance with an embodiment of the present disclosure.

More specifically, the integrated source code is processed by the preprocessors 211 and 212, and the device code and the host code are separated from each other and supplied to the device compiler 226 and the host compiler 213, respectively. In the device compiler, the device code is then subject to front end processing 228, optimization phase processing 222, and back end processing 224 to generate device code machine binary. In the illustrated embodiments, as shown in FIGS. 2A and 3A, a profiler pass 223 is implemented in the device optimization phase 222 and used in both profile instrumentation generation in the instrumented compilation phase and profile guided use in the optimized compilation phase. In one embodiment, the profiler pass 223 is a module pass integrated as part of an Intermediate Representation (IR) pass in the device optimization phase 222, and can be invoked anywhere in the optimization pipeline of the device back end 224 before conversion of the IR code to the machine binary code. However, it will be appreciated that the device profile generation and use functionalities can be implemented in any other well-known suitable manner without departing from the scope of the present disclosure.

As described in greater detail below with reference to FIGS. 2B and 2C, in one embodiment, the profiler pass 223 is configured to generate device instrumentation code for the device functions, which code is included in the IR code output from the device optimization phase 222. The IR code is converted to machine binary through the back end processing.

According to one embodiment of the present disclosure, the profiler pass 223 can generate a CFG for the device code and insert profile counters to instrument the edges and basic blocks of the CFG, thereby producing device instrument code. Besides the device function calls, the device instrument code specifies the profile counters defined for the CFG and includes instructions for a device processor to update the profile counters. The counters are updated each time the associated code is executed. Also generated are the instructions for coordination between the host processor and the device processor, such as memory allocation and initialization. In one embodiment, the instructions are enclosed in a "profinfo" file.

The device instrument code is enclosed in the IR code output from the front end 222. The IR code is then converted to machine binary through the back end processing. The device instrument code is embedded (e.g., as fat binary images) in the front end-processed host code for compilation by the host compiler 213 to generate an object file. In one embodiment, provided with the device instrument code and the "profinfo" file, the host compiler 213 can generate instructions for a host processor to allocate and initialize memory for the counters in the instrumented execution phase, as described in greater detail below with reference to FIGS. 2B-2C. The object file is then processed by the device linker 231 (in case of separate compilation as described below), the host compiler 213, and the host linker 232. As a result, the instrumented executable code is generated for the program. After the execution platform 240 executes the executable, an instrumentation output with the collected profile information is produced, as described in greater detail with reference to FIG. 2C.

In one embodiment, the flow in the dashed-line box 220 may be performed for each virtual architecture, e.g., each Instruction Set Architecture (ISA). For example, CUDA uses a virtual ISA called Parallel Thread Execution (PTX). PTX ISA has improved over time in conjunction with changes to any hardware capabilities. A CUDA library designed to run on multiple GPU architectures will typically be compiled for each architecture separately and bundled together in a file (e.g., "fatbin"). In one embodiment, in a CUDA program, the user can use macros to check for the architecture and diverge on functionality based on the architecture. In some embodiments, an architecture field is added to the host-device communication macros to uniquely identify the different architecture variants.

Generally, for a host processor to perform memory allocation and initialization before launching a kernel, a complete set of device functions directly or indirectly called by a kernel is needed. In one embodiment, in case of whole compilation, the flow in the dashed-line box 210 is performed once as the device instrument code supplied to the host compiler includes a complete function call list (callee list) of each kernel.

However, in case of separate compilation, a complete function call list of a kernel may not be known at the time of compiling the kernel by the device compiler 226. The call graph and the callee list may be only available at link time. In one embodiment, communications between the device compiler 226, the linker 231 and the host compiler 213 are used to achieve instrumentation. Partial instrument information from all compilation units is fed to the linker 231 and combined with the object file. As such, the instrumentation for the entire program, and therefore for a complete function call list, becomes available. In one embodiment, some runtime libraries may be added for supporting remote single-program-multiple-data procedure calling and for providing explicit device manipulation such as allocation of device memory buffers and host-device data transfer.

More specifically, for each compilation unit configured to compile a portion of the source code, the flow in the dashed-line box 210 is performed once and the profiler pass 223 may generate instrumentation related to a partial function call list contained in the portion. During compilation, the device compiler 226 instruments the code as it would for a whole program compilation. In one embodiment, in addition, it emits certain instrument information to the host compiler 213 for the host compiler to declare mirrors for the profile counters.

In one embodiment, an initialized constant variable may be created, containing: 1. Function name, function hash, architecture ID and number of counters for each function; and 2. Partial call list containing calls recognized for one compilation unit.

In one embodiment, at link time, the instrument information from all compilation units is collated and a call graph is generated which contains the partial call graphs using compiler information. This call graph is supplemented with the call graph generated by the linker 231, and instrument code is generated using the combined call list. This instrument code contains all the information necessary for the host side to allocate memory and print profile to a file after a kernel launch. A host side profile stub file is created, compiled and linked to produce the final executable.

In one embodiment, function names may be passed between the device compiler 226 and the device linker 231 using relocations. The device compiler 226 uses function addresses in the counter variable initialization. They turn into linker relocations, which are patched at link time. In another embodiment, function names can be passed as strings.

As the profile information collected for a program is sensitive to changes to the compiler and the source code, it is important that the profile optimization phase 130 uses the correct profile information corresponding to the source file being compiled in the instrumented compilation phase 110 and executed in the instrumented execution phase 120. To this effect, in one embodiment, a Cyclic Redundancy Check (CRC) error detection code can be used to check based on the structure and indexes of the CFG of the program. The CRC code in combination with the function names can be used to verify the validity of profile data from collection to use phase.

Figure 2B:
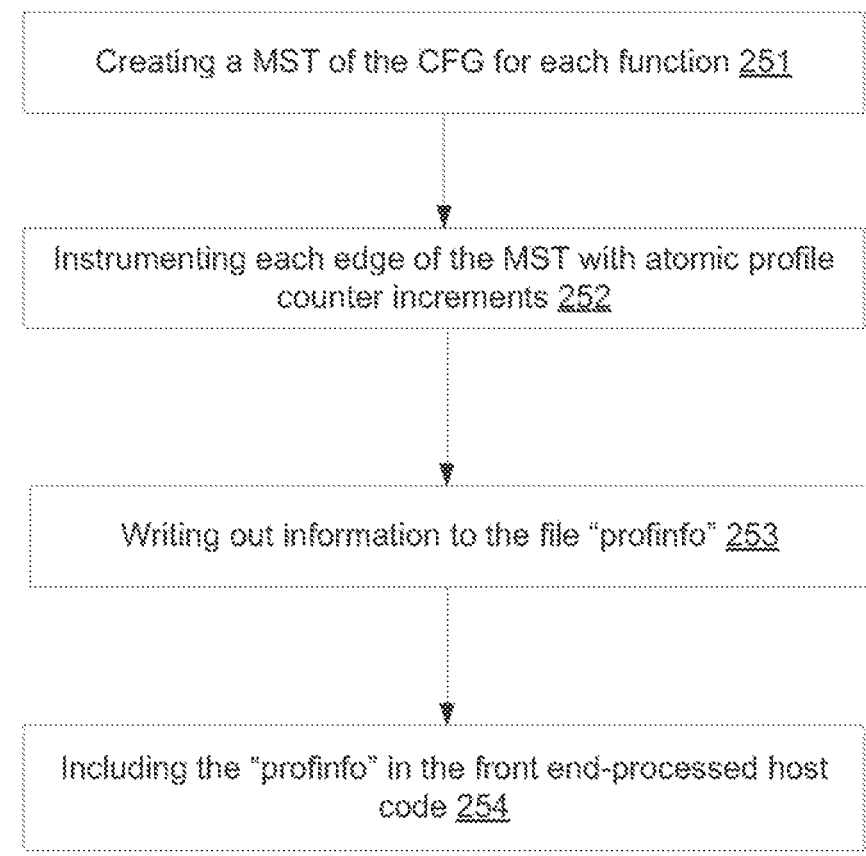
FIG. 2B is a flow chart depicting an exemplary computer implemented process of profile instrument generation in the instrumented compilation phase in accordance with an embodiment of the present disclosure.
Figure 2C:
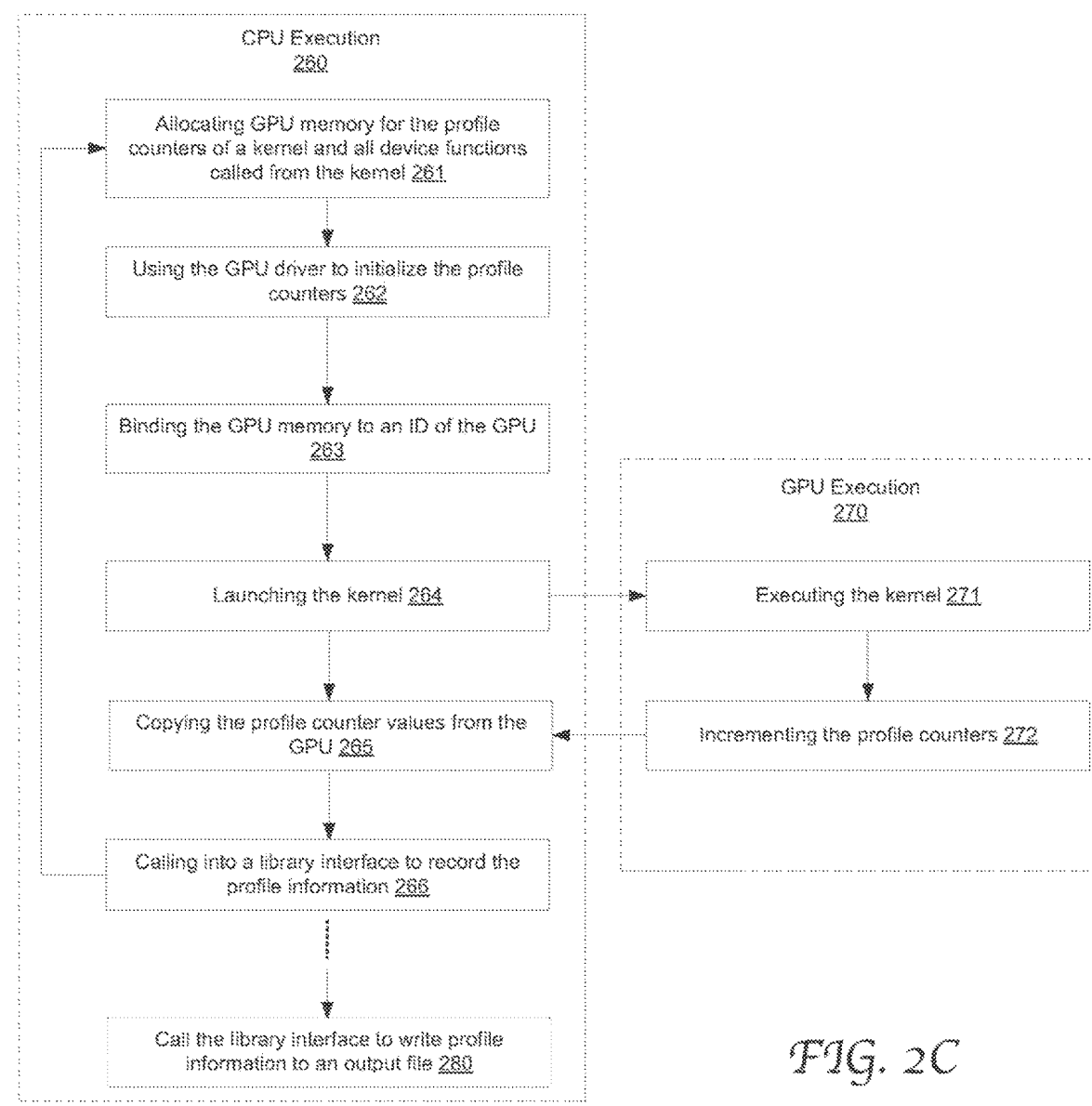
FIG. 2C is a flow chart depicting an exemplary instrumented execution process through coordination between a CPU and a GPU in accordance with an embodiment of the present disclosure.

FIG. 2B is a flow chart depicting an exemplary computer implemented process 250 of profile instrument generation in the instrumented compilation phase in accordance with an embodiment of the present disclosure. For example, process 250 may be performed by the profiler pass 223 shown in FIG. 2A.

At 251, a CFG is generated. In one embodiment, all the edges of the CFG may be instrumented. Alternatively, in the illustrated embodiment, a Minimum Spanning Tree (MST)-based approach is adopted to reduce instrumentation runtime overhead and memory usage. Particularly, an MST of the CFG for each function is created using static profile data and a union-find algorithm. At 252, each edge of the MST is instrumented. If the edge is a critical edge, it is split before any instrumentation code can be added. Profile counts for all basic blocks and edges can be derived from the counts for instrumented edges in the MST. This approach is effective to instrument a significantly reduced number of edges and can significantly reduce instrumentation runtime overhead and memory usage because the sum of all incoming edges is the same as the sum of outgoing edges.

Since device code is inherently parallel, it is important to ensure memory updates for the instrumentation counters are synchronized. In one embodiment, atomic instructions (e.g., PTX instructions) are used to achieve atomic update operations. Particularly, each edge in the MST is associated with atomic profile counter increments at 252.

At 254, the information generated by the profiler pass is written out to the file "profinfo" which is then included in the front end-processed host code for supply to the host compiler.

In the instrumented execution phase, the instrumented executable code enables the host and device processors to coordinate and thereby facilitate generation and output of profile data. FIG. 2C is a flow chart depicting an exemplary instrumented execution process 260 through coordination between a CPU and a GPU in accordance with an embodiment of the present disclosure.

In one embodiment, at the beginning of a kernel execution, all the counters corresponding to the kernel and all the device functions called from it need to be initialized to zero. This trivial issue in a sequential program is in-reality more complicated in CUDA. On the device side, block-Idx 0,0,0 is guaranteed to be present and execute, but there is no guarantee on the ordering of this block relative to other blocks in the kernel. Thus, in one embodiment, the host processor may execute memory initialization before invocation of the kernel. For safety reasons, it may set up and initialize the counters for all architecture variants used during compilation. In the illustrated alternative embodiment, a GPU driver as executed by the CPU is used to perform the initialization based on information passed to it using a special section in the executable.

The flows in the dashed-boxes 260 and 270 illustrate the CPU (host) execution and GPU (device) execution processes, respectively. Steps 261-266 and 271-272 are performed for each kernel invocation at runtime. At 261, the CPU allocates GPU memory for the profile counters of a kernel and all the device functions called from the kernel. At 262, the GPU driver is used to initialize the profile counters. At 263, the GPU memory is bound to an ID of the GPU, e.g., a device symbol name. At 264, the CPU launches the kernel.

In response, the GPU executes the kernel at 271 and increments the profile counters accordingly at 272. As discussed previously, the counters associated with a respective code portion are updated each time the respective code portion is executed at 271. At 265, the CPU copies the profile counter values from the GPU memory, and at 266 calls into a library (e.g., the NVPGO library) interface to record the collected profile information including the counter values. When the execution exits, at 280, the CPU calls the library to write the collected profile information to an output file, e.g., the instrumentation output.

FIG. 3A illustrates an exemplary computer implemented process 300 of optimization compilation to generate optimized executable code based on collected profile information in accordance with an embodiment of the present disclosure. The program source code is fed to the exemplary integrated compiler along with the instrumentation output resulting from flow 200 in FIG. 2A. Similar with the instrumented compilation process 200 in FIG. 2A, the optimization compilation process 300 also involves host compilation, device compilation, and a linking process. In one embodiment, the flow in the dashed-line box 310 may be executed for each compilation unit in case of separate compilation. In one embodiment, the flow in the dashed-line box 320 may be performed for each virtual architecture. However the profiler pass 223 here processes the instrumentation output to enable code optimization by the profile enhanced optimization passes 227, as described in greater detail with reference to FIG. 3B. The profiler pass 223 and the optimization passes 227, in combination, implement the functionalities of profile guided use. In one embodiment, the resultant optimized device code is then embedded (e.g., as fat binary images) in the host code and processed by the host compiler 213 to generate an object file. Eventually, optimized executable code is generated.

Figure 3B:
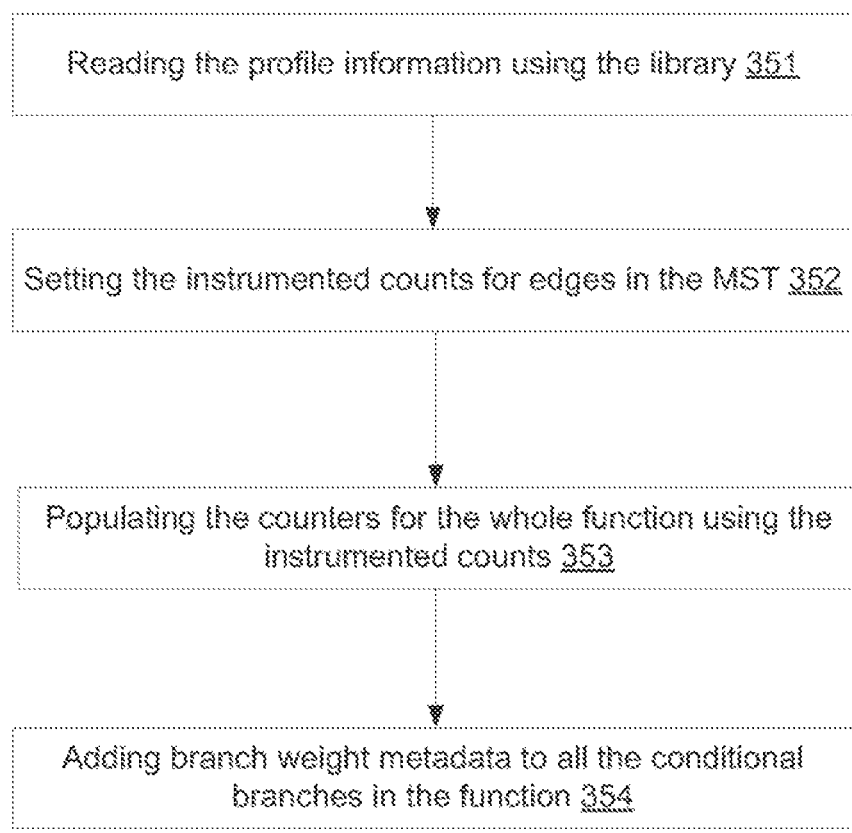
FIG. 3B is a flow chart depicting an exemplary computer implemented process of processing instrumentation output by a profiler pass in the optimization compilation phase in accordance with an embodiment of the present disclosure.

FIG. 3B is a flow chart depicting an exemplary computer implemented process 350 of processing instrumentation output by the profiler pass 223 in the optimization compilation phase in accordance with an embodiment of the present disclosure. At 351, the profiler pass reads the profile information using the NVPGO library. At 352, the profiler pass sets the instrumented counts for the edges in the MST of each function. At 353, the profiler pass populates the counters for the whole function using the instrumented counts. At the end of this step, all basic blocks and edges in a respective function have been assigned with profile counts. At 354, the profiler pass adds branch weight metadata to all the conditional branches in the respective function. In one embodiment, this is done for each function.

In one embodiment, during the optimization compilation phase, the profile enhanced optimization passes 227 may utilize the profile information in accordance with any suitable optimization algorithm that is well known in the art. After process 350, all the optimization passes can query the profile information to obtain counts for edges and basic blocks. The optimization passes may use algorithms such as Inlining, Global Value Numbering (GVN), Loop-Invariant Code motion (LICM), and Loop unrolling, or any other suitable optimization process that is well known in the art.

In one embodiment, the profile information can be passed through the assembly language code (e.g., ptx code) to Optimizing Code Generator (OCG)-enable BBRO, unrolling and spill code placement passes in OCG to make use of basic block instrumentation information from the profile.

Figure 4:
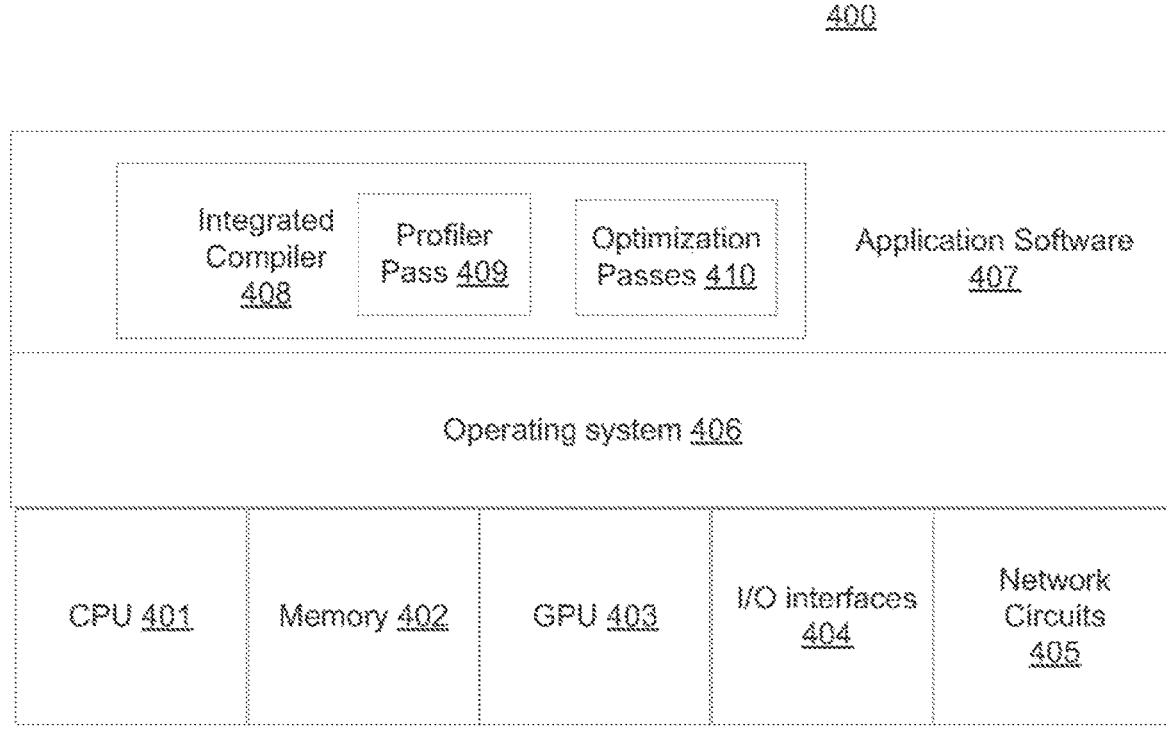
FIG. 4 is a block diagram illustrating an exemplary computing system operable to compile integrated source code and thereby generate instrumented executable code and optimized executable code for device code execution in accordance with an embodiment of the present disclosure.

FIG. 4 is a block diagram illustrating an exemplary computing system 500 operable to compile integrated source code and thereby generate instrumented executable code and optimized executable code for device code execution in accordance with an embodiment of the present disclosure. In one embodiment, system 400 may be a general-purpose computing device used to compile a program configured to be executed concurrently by a host processor and one or more device processors in parallel execution system. System 400 comprises a Central Processing Unit (CPU) 401, a system memory 402, a Graphics Processing Unit (GPU) 403, I/O interfaces 404 and network circuits 405, an operating system 406 and application software 407 stored in the memory 402. Software 407 includes an exemplary integrated compiler 408 configured to compile source code having a mixture of host code and device code.

In one embodiment, provided with source code of the program and executed by the CPU 401, the integrated compiler 408 can generate instrumented executable code in an instrumented compilation phase. The instrumented executable code includes: profile instrumentation counters for the device functions; and instructions for the host processor to allocate and initialize device memory for the counters and to retrieve collected profile information from the device memory to generate instrumentation output.

Provided with the instrumentation output, the integrated compiler 408 can compile the source code to generate optimized executable code in an optimized compilation phase for device code execution. The compiler 408 includes a profiler pass 409 and one or more optimization passes 410, which are configured to process the instrumentation output (e.g., map the profile counters to the device CFG) and optimize the device code. The compiler 409 may perform various other functions that are well known in the art as well as those discussed in details with reference to FIGS. 1-3B.

What is claimed is:

1. A method comprising:
   executing instrumented executable code using a host processor in coordination with a co-processor, the executing by the host processor comprising:
      allocating memory for one or more profile counters that are associated with one or more portions of the instrumented executable code;
      initializing the one or more profile counters using a driver associated with the co-processor;
      launching an instance of a function after the initializing of the one or more profile counters;
      causing execution, by the co-processer using the instance of the function, of the one or more portions of the instrumented executable code and an update, by the co-processor, to the one or more profile counters based on the execution; and
      retrieving profile information that corresponds to the one or more profile counters after the update.

2. The method of claim 1, wherein the host processor is a Central Processing Unit (CPU) and the co-processor is a Graphics Processing Unit (GPU).

3. The method of claim 1, wherein update includes incrementing the one or more profile counters in atomic operations.

4. The method of claim 1, wherein the memory for the one or more profile counters is allocated by the host processor in a co-processor memory of the co-processor.

5. The method of claim 1, wherein the instance of the function comprises a kernel, the one or more profile counters are associated with functions of the kernel, and the causing execution of the one or more portions of the instrumented executable code includes invoking the kernel.

6. The method of claim 1, wherein the retrieving of the profile information includes the host processor copying the one or more profile counters from a co-processor memory to a host processor memory.

7. The method of claim 1, wherein the retrieving includes the host processor calling a library to write the profile information into a file.

8. The method of claim 1, further comprising, subsequent to retrieving the profile information, providing the profile information to a compiler that generates optimized executable code based at least on the profile information.

9. A method comprising:
   executing instrumented executable code using a co-processor in coordination with a host processor, the executing by the co-processor comprising:
      receiving one or more profile counters bound to an identifier of the co-processor, the one or more profile counters associated with one or more portions of the instrumented executable code and allocated in memory by and initialized by the host processor;
      executing the one or more portions of the instrumented executable code using an instance of a function launched after the receiving; and
      recording updates to the one or more profile counters based at least on the executing of the one or more portions of the instrumented executable code, wherein the host processor incorporates the updates to the one or more profile counters into profile information.

10. The method of claim 9, wherein the host processor is a Central Processing Unit (CPU) and the co-processor is a Graphics Processing Unit (GPU).

11. The method of claim 9, wherein the recording of the updates includes incrementing the one or more profile counter in atomic operations during the executing of the one or more portions of the instrumented executable code.

12. The method of claim 9, wherein the instance of the function comprises a kernel, the one or more profile counters are associated with functions of the kernel, and the executing of the one or more portions of the instrumented executable code includes running the kernel based at least on an invocation from the host processor.

13. The method of claim 9, wherein the one or more profile counters are allocated by the host processor from a co-processor memory using a driver associated with the co-processor.

14. The method of claim 9, wherein the updates to the one or more profile counters include an increment to a profile counter of the one or more profile counters for each iteration of a plurality of iterations that a portion of the one or more portions of the instrumented executable code that is assigned to the profile counter is executed.

15. A system comprising:
   a host processor; and
   at least one memory coupled to the host processor and storing at least a portion of instrumented executable code associated with a program to be executed by a Graphics Processing Unit (GPU) and the host processor that, when executed by the host processor, causes the host processor to perform a method comprising:
      allocating memory from a GPU memory for one or more profile counters assigned to device functions of a kernel of the GPU;
      initializing the one or more profile counters using a driver associated with the GPU;
      launching the kernel after the initializing of the one or more profile counters, wherein the GPU updates the one or more profile counters based at least on execution of the device functions; and
      retrieving profile information that corresponds to the updates to the one or more profile counters.

16. The system of claim 15, wherein the retrieving of the profile information includes the host processor copying the one or more profile counters from the GPU memory to a host processor memory.

17. The system of claim 15, wherein the retrieving includes the host processor calling a library to write the profile information into a file.

18. The system of claim 15, wherein the method further comprises, subsequent to retrieving the profile information, providing the profile information to a compiler that generates optimized executable code of the program based at least on the profile information.

19. The system of claim 15, wherein the host processor is a Central Processing Unit (CPU).

20. The system of claim 15, wherein the at least one memory comprises executable code allowing the host processor to allocate memory for and initialize the one or more profile counters for multiple GPU architectures.

\* \* \* \* \*